United States Patent
Rohrseitz

(10) Patent No.: US 8,711,337 B2
(45) Date of Patent: Apr. 29, 2014

(54) PASSIVE TRANSLATIONAL VELOCITY MEASUREMENT FROM OPTICAL INFORMATION

(75) Inventor: Nicola Rohrseitz, Arzo (CH)

(73) Assignee: University of Zurich, Zurich (CH)

( * ) Notice: Subject to any disclaimer, the term of this patent is extended or adjusted under 35 U.S.C. 154(b) by 428 days.

(21) Appl. No.: 13/131,929

(22) PCT Filed: Dec. 16, 2009

(86) PCT No.: PCT/EP2009/067252
§ 371 (c)(1),
(2), (4) Date: May 31, 2011

(87) PCT Pub. No.: WO2010/069980
PCT Pub. Date: Jun. 24, 2010

(65) Prior Publication Data
US 2011/0235028 A1    Sep. 29, 2011

(30) Foreign Application Priority Data
Dec. 18, 2008 (EP) .................................... 08172123

(51) Int. Cl.
*G01S 11/12* (2006.01)
*G01C 11/16* (2006.01)

(52) U.S. Cl.
CPC ................ *G01S 11/12* (2013.01); *G01C 11/16* (2013.01)
USPC ........................................................ 356/28

(58) Field of Classification Search
CPC ................................ G01C 11/16; G01S 11/12
USPC ........................................................ 356/28
See application file for complete search history.

(56) References Cited

U.S. PATENT DOCUMENTS

| 3,904,295 | A | * | 9/1975 | Hock et al. ..................... 356/398 |
| 4,099,878 | A | * | 7/1978 | Lee ................................ 356/128 |
| 4,286,872 | A | * | 9/1981 | Schneider et al. .............. 356/28 |

(Continued)

FOREIGN PATENT DOCUMENTS

| GB | 2 298 919 A | 9/1996 |
| JP | 2000155125 A | 6/2000 |

OTHER PUBLICATIONS

J. T. ATOR, "Image-Velocity Sensing with Parallel-Slit Reticles," J. Opt. Soc. Am. 53, 1416-1419 (1963) http://www.opticsinfobase.org/josa/abstract.cfm?URI=josa-53-12-1416.*

(Continued)

*Primary Examiner* — Luke D Ratcliffe
*Assistant Examiner* — Ari M Diacou
(74) *Attorney, Agent, or Firm* — Winstead PC

(57) ABSTRACT

The invention is a passive method to measure the translational speed of a visual scene using the distribution of light intensities. The invention combines two principles: perspective distortion matching over a broad field of view, and temporal filtering variation. The perspective distortion of the image is used to sample the visual scene at different linear wavelengths over the visual field. The result is a spatial sensitivity map of the visual scene. The obtained signal is then temporally filtered with cutoff frequencies proportional to the spatial sensitivity. The final result is a wide-spectrum computation of a ratio between temporal and linear spatial frequencies, in other words linear speed. The technique does not require the emission of a reference signal and is independent from external infrastructures.

4 Claims, 6 Drawing Sheets

(56) References Cited

U.S. PATENT DOCUMENTS

| | | | |
|---|---|---|---|
| 4,921,345 A * | 5/1990 | Tsuchitani et al. | 356/28 |
| 4,961,643 A * | 10/1990 | Sakai et al. | 356/28 |
| 5,101,112 A * | 3/1992 | Amari | 250/559.32 |
| 5,307,293 A * | 4/1994 | Sakai | 702/143 |
| 5,642,194 A * | 6/1997 | Erskine | 356/497 |
| 5,745,226 A * | 4/1998 | Gigioli, Jr. | 356/28 |
| 5,828,444 A * | 10/1998 | Nomura | 356/28 |
| 6,043,869 A * | 3/2000 | Uno et al. | 356/28 |
| 6,384,905 B1 | 5/2002 | Barrows | |
| 7,835,223 B2 * | 11/2010 | Goujon | 367/21 |
| 8,355,119 B2 * | 1/2013 | Bergmann | 356/28 |
| 2004/0239932 A1 * | 12/2004 | Brogioli et al. | 356/337 |
| 2011/0116073 A1 * | 5/2011 | Bergmann | 356/28 |
| 2011/0285983 A1 * | 11/2011 | Bergmann et al. | 356/28 |

OTHER PUBLICATIONS

K. Christofori, K. Michel, Velocimetry with spatial filters based on sensor arrays, Flow Measurement and Instrumentation, vol. 7, Issues 3-4, Sep.-Dec. 1996, pp. 265-272, ISSN 0955-5986, http://dx.doi.org/10.1016/S0955-5986(96)00012-X. (http://www.sciencedirect.com/science/article/pii/S095559869600012X).*

Reto, Davide, "International Search Report" for PCT/EP2009/067252 as mailed Mar. 19, 2010, 2 pages.

* cited by examiner

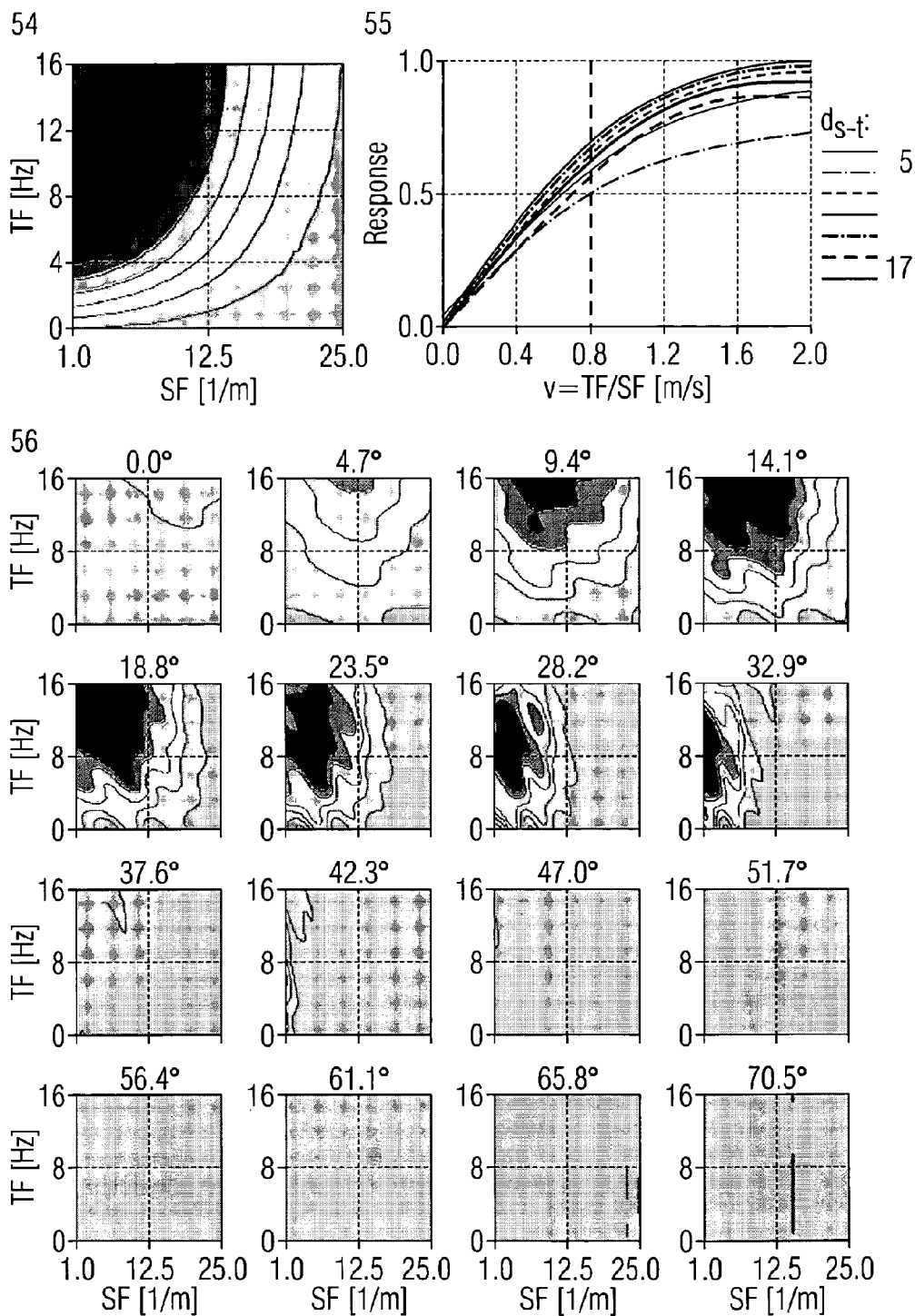

PASSIVE TRANSLATIONAL VELOCITY MEASUREMENT FROM OPTICAL INFORMATION

BACKGROUND

1. Field of the Invention

The present invention relates to a method and a system for determining a linear speed of an object, in particular in a Cartesian frame of reference.

2. History of the Related Art

Linear speed computation could benefit applications such as self-guided vehicles (at 2 in FIG. 1), mobile robotics, smart vision systems, and body movement control for therapy (at 3 in FIG. 1) and entertainment (at 4 in FIG. 1). In general, the measurement of linear speed from optical information is useful to technical applications because it operates in the frame of reference of translating movements.

Moreover, linear speed can be used to compute the distance traveled. This requires multiplying the linear speed signal by the appropriate time interval.

The passive measurement of the linear speed from a visual scene relies on the light distributions generated by a translation. It is a technically challenging task mainly because a wide-field scene moving at constant translational speed projects on an image plane as a heterogeneous field of apparent speeds that depends on the distribution of spatial frequencies (FIG. 2). This field is called optical flow, and is what the existing visual speed sensors measure.

Each velocity vector of the optical flow field is a projection of the translational speed. These vectors can thus render the translational speed by means of a spherical-to-cartesian transformation. This requires, besides the intensity, direction and location of the vector in the spherical field, also the distance between the sensing entity and the projected moving object. This principle is applied in the so-called "V/H" sensors. These have commonly a narrow field of view, pointed perpendicularly to the direction of translation.

Unfortunately, the computation of speed using the V/H sensor is not as robust as it would be desirable in terms of accuracy.

SUMMARY

It is therefore an objective of the present invention to provide a method to measure linear speed using an optoelectronic device.

Contrary to V/H sensors, the present invention computes speed over a wide-field of view, and therefore it is more robust over a broad range of spatial frequencies (the inverse of linear wavelength). Moreover, contrary to conventional optical flow sensors, the spatial and temporal filtering properties of the invention can be adapted to the requirements of the target application.

Industry standard systems on the other hand rely on computationally intensive feature-matching algorithms (e.g., "block matching"). Contrary to these, the invention is computationally lightweight.

The aim of the invention is therefore to measure speed in the cartesian frame of reference with little computational overhead.

This aim is achieved by the features given in claim 1 for the method and in claim 4 for the system.

According to claim 1, the method for determining a linear speed of an object comprises the steps of:

a) sampling a series of light intensity courses I(t) over the time t; each light intensity courses I(t) covering a different azimuthal direction, each different azimuthal direction thereby defining a detection length of a series of detection lengths as seen in the direction of the linear speed to be determined;

b) transforming the series of detection lengths for the azimuthal directions into a series of linear spatial frequencies;

c) defining for each azimuthal direction a band pass or a high pass filter, thereby relating for each detection length the characteristic filter frequencies to the respective linear spatial frequencies;

d) filtering the sampled light intensity for each azimuthal direction with the respective band pass or high pass filter to obtain a set of filtered light intensities;

e) calculating the linear speed by dividing the characteristic filter frequencies through the spatial frequencies for at least one of azimuthal directions for which the filtered light intensity exceeds a predefined threshold; and f) determining the linear speed by correlating the calculated linear speeds for those azimuthal directions for which the filtered light intensity exceeds the predefined threshold.

With respect to the technical terms used above, some detailed information is given below on how to interpret these terms. Azimuthal direction means a spatial angle between two angles. For example, the total azimuth of 90° is divided into 18 azimuthal directions meaning every azimuthal direction to cover 5° of the total azimuth of 90°. The detection length or also called herein linear wavelength is the length of each azimuthal direction in the direction of the linear speed. The detection length is therefore a function of the azimuthal direction and the distance to the physical structures perpendicular to the linear speed vector. The transformation of these detection lengths leads to the inverse of the detection lengths which is called hereinafter the spatial frequencies. The characteristic filter frequencies are those frequencies that are related to the throughput frequencies of the filter. The throughput frequencies are related to the spatial frequencies of each of the azimuthal directions. The more perpendicular the azimuthal direction is oriented, the higher are the characteristic filter frequencies. In a preferred embodiment, the average of the lower and upper cut-off frequency of a band pass filter specified for a distinct azimuthal direction matches with the periodic time of the substantially sinusoidal intensity pulse occurring for this specific detection length. When the intensity structure of the light source does not match with the detection length of the respective azimuthal direction the intensity pulse deviates more from the substantial sinusoidal form; either broadens and becomes flatter in terms of intensity or tapers and becomes higher in terms of intensity. Consequently, the intensities I (t) measured for these azimuthal directions are filtered out and these azimuthal directions can therefore not contribute to the determination of the linear speed. Therefore, a predefined threshold for the intensity signal after filtering has to be defined. When a filtered intensity will exceed this threshold, the temporal frequencies TF (the range of the throughput frequencies) have to be divided by the spatial frequencies for each specific azimuthal direction delivering a course of a normalized response over the velocity v=TF/SF wherein the peaks of these normalized responses for a plurality of azimuthal directions deliver finally the linear speed.

The invention therefore does the determination of the linear speed spoken in general terms by combining two principles: perspective distortion matching and temporal filtering variation. The process of passively extracting the velocity from a visual scene using the invention requires a set of photoreceptors (i.e., light intensity encoders) with defined angular aperture, and variable band-pass filtering. These two components allow exploiting the three crucial concepts required for measuring speed from passive visual information:

Every instantaneous natural visual scene is separable in a series of linear spatial frequencies.

Every point in a natural visual scene is separable in a series of temporal frequencies.

Speed is the ratio between temporal and spatial frequency (v=TF/SF).

From a point-like, radial perspective, any linear wavelength projects on a circle as a combination of increasing angular wavelengths. This trivial phenomenon is known as perspective distortion. The opposite situation is to project an angular wavelength on a line, which results in increasingly long linear wavelengths. Using this last principle to sample identical angular wavelengths over a broad)(~90°) angular opening means acquiring a multitude of linear wavelengths. As every instantaneous natural visual scene is separable in a series of linear spatial frequencies (i.e., the inverse of a linear wavelength), each angular receptor sensitive to an angular wavelength will be able to sample a different linear spatial component. This means that the perspective distortion from linear to angular creates a linear spatial filter that depends on the direction of sampling. The combination of a set of identical angular photoreceptors directed on different coplanar axes creates therefore a sensitivity map for a broad range of linear spatial frequencies.

The spatial sensitivity must be matched by an adequate temporal sensitivity that results in the encoding of speed. The domain of temporal filters has been extensively studied, and has a wide range of industrial applications. The appropriate filter to apply to the spatial sensitivities is either high-pass or band-pass. The temporal cut-off frequencies must be proportional (v=TF/SF) to those created by the spatial filters, to result in sensitivity to linear speed which range has to be contemplated upon when designing the azimuthal resolution.

The gist of the invention is thus divided in two:
Broadband spatial filtering using perspective distortion
Matching temporal filtering variation to obtain linear velocity measurement These features provide a robust and computationally-light-weight method of measuring speed in a linear frame of reference. The method is largely independent of the precise details of implementation (software, electronic, digital, analog, ... ). These affect the performance and quality of the computation, making the method adaptable to different kinds of applications. Because of the small computational overhead, the method can be embedded in portable devices.

BRIEF DESCRIPTION OF THE DRAWINGS

FIG. 9 shows an output of a preferred embodiment in terms of its spatio-temporal sensitivity and its velocity dependence as well as in the subfigures the spatio-temporal plots of individual subsystems.

DETAILED DESCRIPTION OF THE INVENTION

Translating movements are present in a large variety of occurrences: human bodies, helicopters, airplanes, cars, videogame controls, robots et cetera. An embodiment 1 of the present invention can be placed on each one of these applications.

Figure 1:
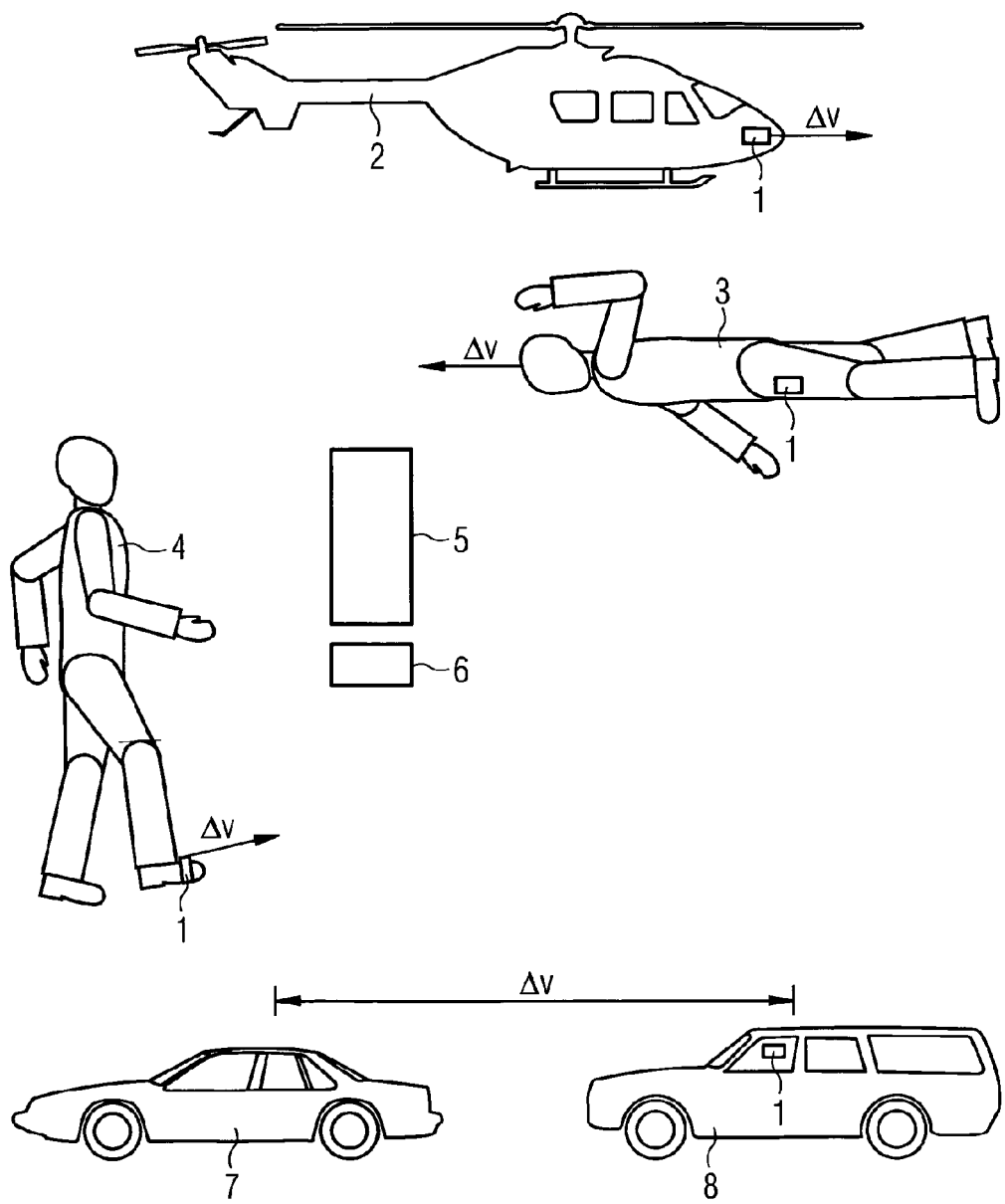
FIG. 1 presents schematical representations of a range of applications of the invention.

FIG. 1 shows four examples of applications. 2 is an autonomous helicopter that uses an embodiment 1 of the invention to measure it own translational speed. 3 is a person swimming wearing the embodiment 1 of the invention. 4 is a person playing videogames (e.g., soccer simulation) on a console system 6 that wirelessly receives movement speed from the embodiment 1 of the invention, giving feedback in real-time on a display system 5. 7 and 8 are cars travelling at different speeds, which is measured on 8 by the embodiment 1 of the invention.

Figure 2:
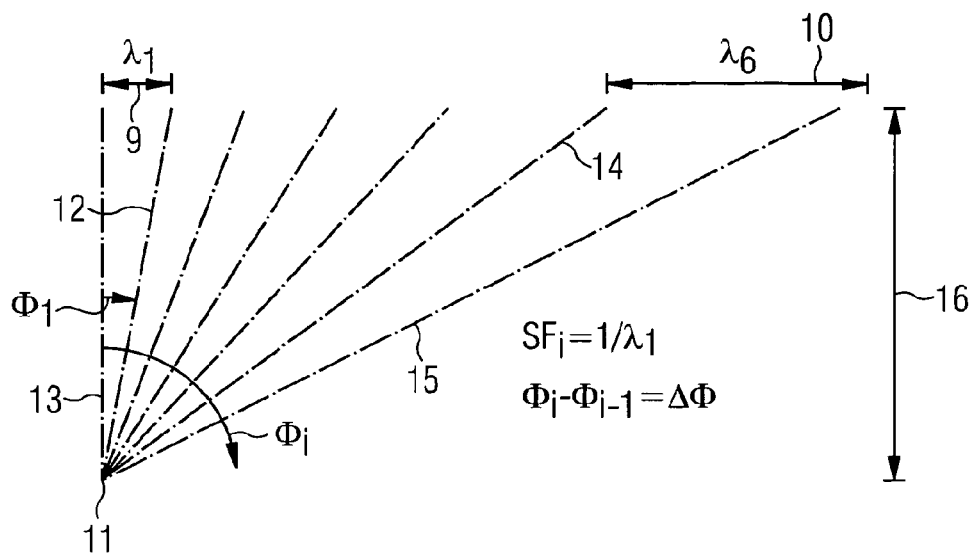
FIG. 2 is a representation of the perspective distortion concept as exploited in the invention.

The invention makes use of two principles:
Perspective distortion matching
Temporal filtering variation Perspective distortion maps different linear wavelengths (detection lengths) to different angular positions. FIG. 2 shows this principle: from a point-like perspective 11, two objects 9 and 10 having different linear sizes $\lambda_1$ and $\lambda_2$ can project the same angular size (angle (azimuthal direction) between 12 and 13 for object 9, and angle (azimuthal direction) between 14 and 15 for object 10) according to the sampling azimuth and a perpendicular distance 16 (perpendicular to the direction of the speed vector to be determined).

A set of photoreceptors with identical angular aperture pointed in different azimuthal directions thus samples a wide spectrum of linear wavelengths. Each linear wavelength is mapped onto an azimuthal position.

The invention computes linear velocity using frequencies by means of the formula $$v=TF/SF$$

where TF and SF are the temporal and spatial frequencies, respectively. The computation is done by matching the spatial filtering with an appropriate temporal filtering; the cutoff frequencies vary thus with the azimuth.

Figure 3:
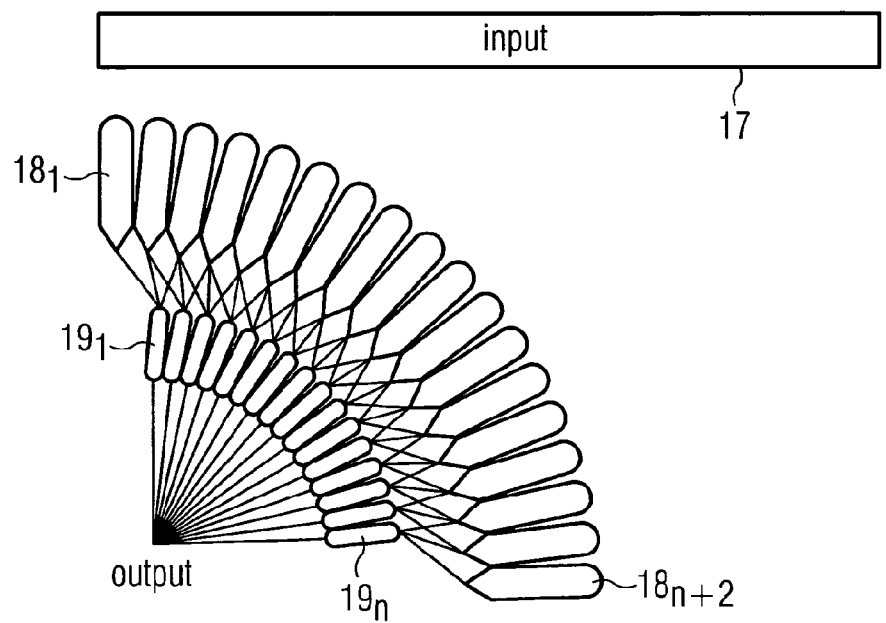
FIG. 3 is a representation of the division of the invention in subsystems.

FIG. 3 shows a conceptual overview of the invention. It is composed of a set of subsystems 19, each of which has different spatio-temporal filtering properties. The subsystems use the information 17 from an array of photoreceptors 18 to each compute linear speed in a narrow spatio-temporal frequency band. Combined, these narrow bands provide uniform speed computation capabilities over broad range of frequencies.

Figure 4:
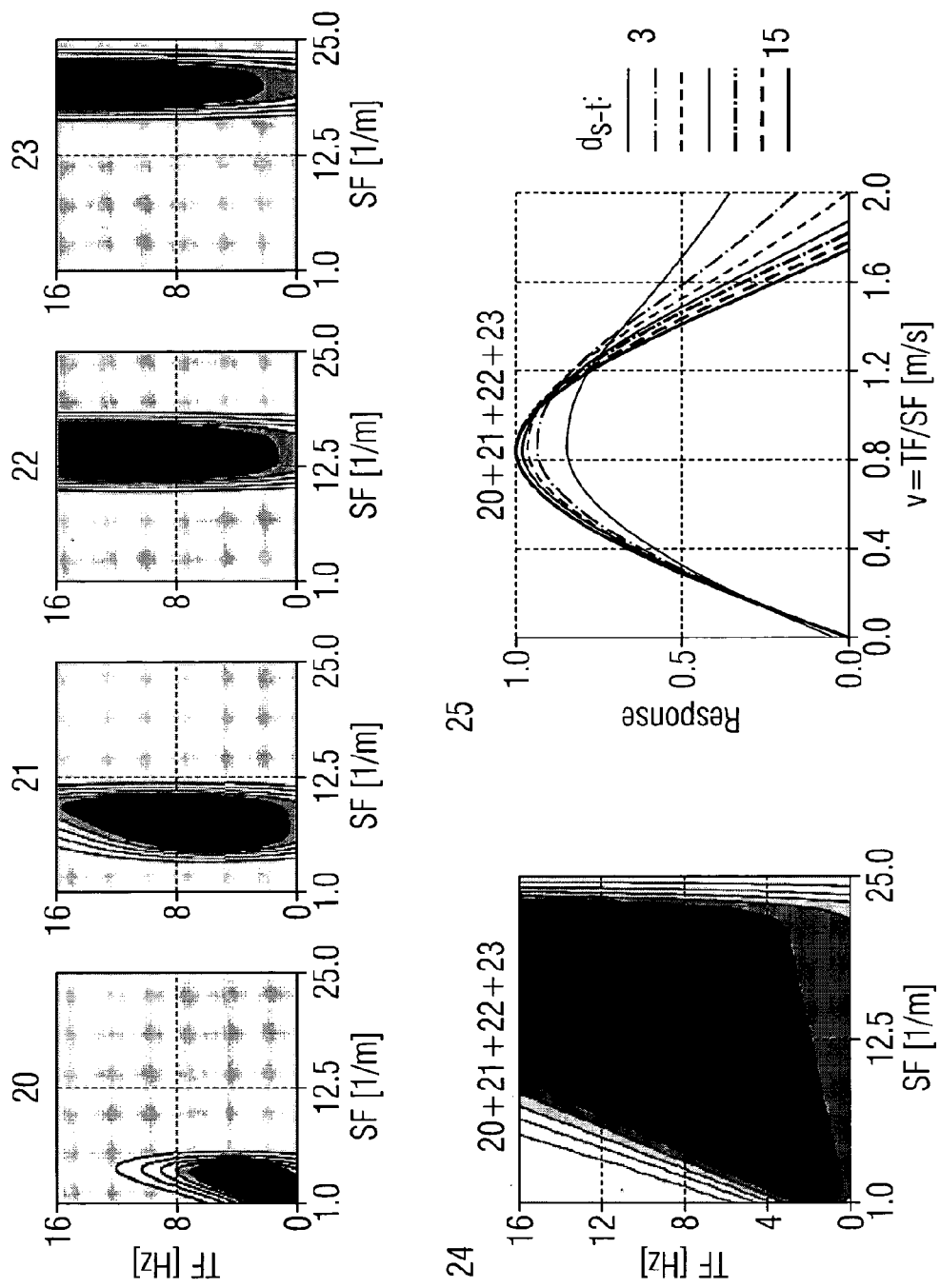
FIG. 4 illustrating the data of different subsets and the determination of the translational speed.

Each subsystem 19 is identical, up to the spatial sampling axis, and the temporal filtering properties. The subsystem can be designed according to the performance needs of the final application. FIG. 4 shows the conceptual data form. 20, 21, 22, 23 show the spatio-temporal frequency bands of four subsystems, showing the shift in temporal and spatial sensitivity. Only by summing the sensitivities of these subsystems at 24, the invention provides velocity computing over a broad range of frequencies at 25.

Figure 5:
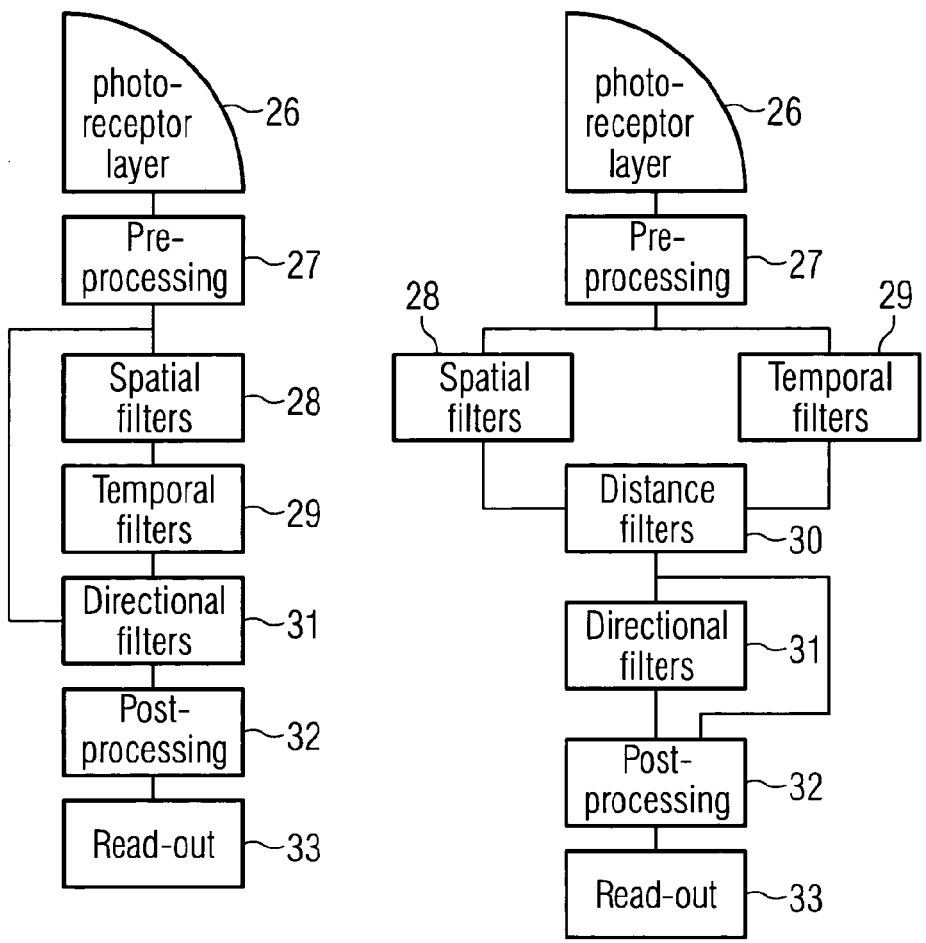
FIG. 5 is a schematic representation of the general implementations of the present invention.

FIG. 5 shows the two general embodiments of the subsystems of the invention. The first subsystem is composed of a set of photoreceptors 26, a preprocessing stage 27, spatial bandpass filters 28, temporal filters 29, directional filters 31, a postprocessing stage 32, and a read-out system 33. It works as follows: the light intensity distribution generated by a translation is captured by the photoreceptors 26, and passed to the preprocessing stage 27 that calibrates and possibly decimates it to reduce the stream of incoming information. The resulting array is hence filtered, first spatially 28, then temporally 29 (or viceversa). The direction of the visual stimulus is determined from the spatio-temporally filtered signal. A postprocessing stage arbitrates the output of the subsystems, and calibrates the speed signal. The result of this general embodiment provides a speed signal using 33 that is dependent on the distance to the moving objects (16 in FIG. 2). For determining the absolute speed, either a fixed reference or a distance sensor can be used.

In the second general embodiment, the distance is computed by combining the spatial and temporal information at 30.

Both the general embodiments can have hardware, software or mixed implementations.

Figure 6:
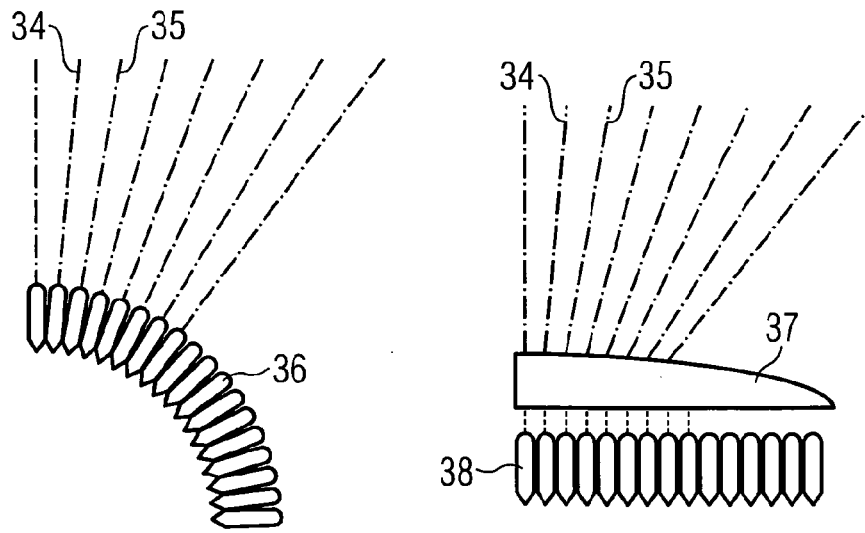
FIG. 6 shows schematically the equivalence of angularly arranged photoreceptors and a system composed of a planar photoreceptor array and a fisheye lens.

FIG. 6 shows that the required angular spatial sampling (angle between optical axes 34 and 35) can be achieved using angularly-arranged photoreceptors 36 or also a wide-angle fisheye lens 37 over a planar array of photoreceptors 38.

Figure 7:
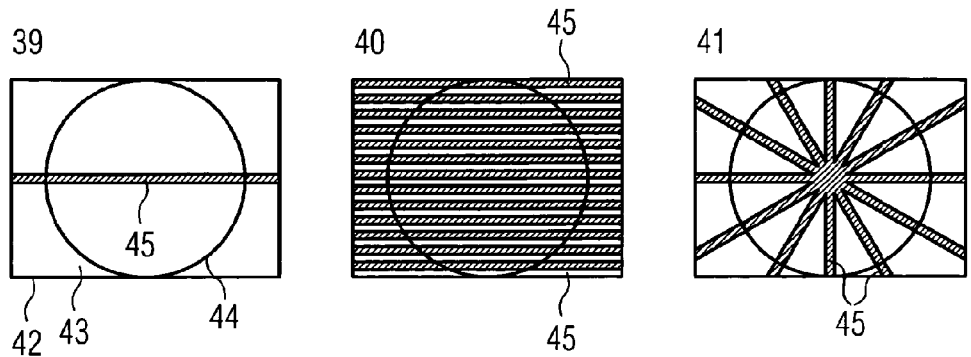
FIG. 7 presents three examples of sampling modes on a planar imaging sensor.

The invention described this far computes the translating speed in one direction. To measure translating speed in different directions requires to appropriately placing the photoreceptor arrays. This can be done by exploiting the perspective distortion principle in different directions. FIG. 7 shows that the image 44 coming through a fisheye lens projects on a planar imaging sensor 42 with a bidimensional linear array of pixels 43. Sampling along order 45 allows generating different speed sensing modes (examples 39, 40, 41). These modes allow measuring speed in different directions of space, and with different spatial properties because of the optical properties of the lens.

One preferred embodiment (FIG. 8) of the first general embodiment shown in FIG. 5 is composed of eighteen (n+2=18) photoreceptors 18 for sixteen identical (n=16), parallel subsystems 19 (processing lines). Each of these sixteen subsystems 19 points radially in a different azimuthal direction of an angular field of view, receiving input from 3 photoreceptors, and performs four scalar operations (wiring diagram shown in FIG. 8).

Figure 8:
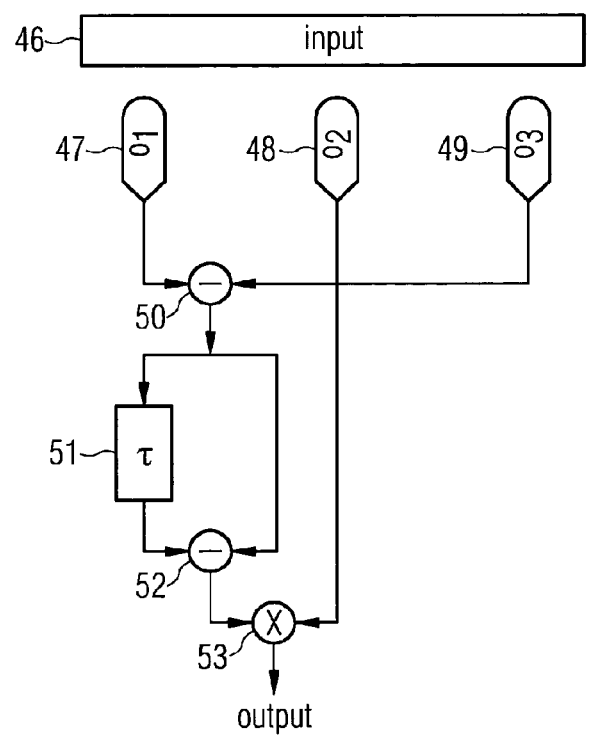
FIG. 8 is a schematic representation of the preferred embodiment of each of the subsystems with respect to the calculation of the linear speed for each of the subsystems.

Three photoreceptors $o_1$, $o_2$, $o_3$ in FIG. 8 are arranged one next to the other, and sample the light intensity on a narrow aperture (e.g., 5° with n=16), each in three adjacent azimuthal directions of the angular field of view. Each photoreceptor $o_1$, $o_2$, $o_3$ receives a signal that can be decomposed, using the Fourier Transform, into:

$$I(t) = I_o \cdot \sin(2\pi \cdot t \cdot TF + \phi_x),$$

where $I_o$ is the Fourier amplitude, TF is the temporal frequency and $\phi_x$ is the phase shift between the signals on each photoreceptor $o_1$, $o_2$, $o_3$.

The phase shift $\phi_x$ depends on the aperture between photoreceptors $\Delta\phi$ and the spatial frequency SF:

$$\phi_x = 2\pi \cdot \Delta\phi \cdot SF.$$

The inputs 47, 49 from the photoreceptors at the extremes $o_1$, $o_3$ of each subsystem 19 are subtracted at 50 one from another, resulting in a first difference signal $s_{13}$:

$$s_{13} = o_1 - o_3 = 2 \sin(-\phi_x) \cdot \cos(2\pi \cdot t \cdot TF)$$

The amplitude of this first difference signal $s_{13}$ is dependent on the linear spatial frequency content of the input signals, and it peaks at an angular wavelength of 20°: $SF_{a,peak} = 1/4\Delta\phi$. Pointing in different directions, the sub-systems 19 are thus sensitive to different linear wavelengths (as shown in FIG. 9 for different azimuths).

The next step is to temporally filter the signal $s_{13}$, using appropriate cutoff frequencies to match the spatial filtering properties. The resulting signal $t_{13}$ can obtained using any industrial grade filter (e.g., Bessel or Chebychev) on the signal $s_{13}$. One simple method to implement the temporal filter for a specific range of speeds is to subtract two temporally phase-shifted signals. Thus, the resulting first difference signal $s_{13}$ from the first stage subtraction 50 is split on two lines, one of which has a temporal delay $\tau$ 51. The phase-shifted, split signals are subtracted one from the other to obtain a second difference signal $ts_{13}$:

$$ts_{13} = s_{13} - \text{delayed } s_{13} = -4 \sin(-\phi_x) \cdot \sin(-\tau/2) \cdot \sin(2\pi \cdot t \cdot TF + \tau/2)$$

The amplitude of this signal $ts_{13}$ is dependent on the temporal frequency content of the input signals, and it peaks at a temporal period (inverse of the temporal frequency) equal to the amount of temporal delay $\tau$. Each subsystem 19, has a different temporal delay that matches the spatial characteristics: to create the speed dependent signal, $\tau$ must be inversely proportional to the spatial sensitivity. With $\Delta\phi=5°$, for instance, a velocity-dependent signal is generated using $\tau=5$ ms for the subsystem $19_1$ pointing perpendicularly to the speed vector, with a fixed increase of 0.5 ms for the each of the other subsystems, culminating with $\tau=13$ ms for the sixteenth subsystem $19_{16}$.

The amplitude of the resulting signal from the temporal filtering stage ($ts_{13}$) is proportional to the speed of the input of the photoreceptors $18_1$ to $18_{n+2}$. To resolve the ambiguity of direction, and to provide an output under the form of mean offset, the second difference signal $ts_{13}$ is multiplied at 53 by the signal 48 incoming from the central photoreceptor $o_2$.

This operation generates the output of a single subsystem sso, whose mean value presents bandpass filtering properties over the spatial and temporal frequency:

$$sso = ts_{13} o_2 = -2 \sin(-\phi_x) \cdot \sin(-\tau/2) \cdot (\cos(\tau/2) \cdot \cos(4\pi \cdot t \cdot TF + \tau/2))$$

The narrow spatio-temporal filtering means that sso is proportional to the linear speed vector in the range of the considered subsystem (not visible in the expression of sso because it describes only part of the result). The maximum value of all subsystems $19_1$ to $19_n$ provides a speed-dependent signal over a broad range of temporal and spatial frequencies. This example implementation is based on a distance reference, which can be used to measure the distances to other objects in the field of view. The dependency of speed on the TF, SF, the distance d, and the azimuth a is visible in:

$$v = TF \cdot d \cdot \arctan(\cos^2 a / (d + \cos a \cdot \sin a / SF) / SF)$$

FIG. 9 shows an output of the preferred embodiment. 54 shows its spatio-temporal sensitivity and 55 its velocity dependence. The subfigures below show the spatio-temporal sensitivity plots of individual subsystems, pointing at the indicated azimuths.

Examples

Measuring linear speed visually has many potential technical applications. The flagship application of the passive, visual linear speed sensor (VLSS) is self-control in physical exercises. The effectiveness of physical training for therapy and performance improvement depends on the speed of the movements. Muscle tone, bone strength, and joint wear all require appropriate speeds of execution that vary over the period of exercise. The VLSS can provide the adequate feedback on the execution, allowing the exerciser to adjust its movements for an optimal training. Being independent of physical contact and lightweight, the VLSS for physical training can be used anywhere and without further equipment.

Furthermore, the VLSS has potential applications in the transportation, sport, entertainment, medicine, surveillance, and manufacturing industries. The following is a short list of applications where the introduction of the invention would be useful:

Using the VLSS on a car allows measuring its absolute speed, and the relative speed of the surrounding traffic (e.g., speed difference between car 7 and 8 in FIG. 1).

Using the VLSS on professional sports fields allows easier measurement of the movements of the players (e.g., for swimmers, as 3 in FIG. 1) or of other parts of the competition (e.g., ball, discus).

Using the VLSS in human-machine interfaces allows having a more precise reading of the movements of the body in three dimensions. This information can be used to guide virtual objects for entertainment (e.g., soccer videogame, as played by 4 using console 6 and display 5 of FIG. 1) or rehabilitation purposes.

Using the VLSS on a small flying robot allows it to move autonomously indoors or when GPS is not available or does not have the required resolution (e.g., autonomous helicopter as in 2 of FIG. 1).

Using the VLSS in a portable phone or photocamera allows adding speed information to static pictures or video.

Using the VLSS on rail freight cars allows for higher speed and security when automatically arranging cargo on dead tracks.

Using the VLSS on manufacturing lines reduces the costs of automation.

Engineering Considerations

Hereinafter some information is listed on the engineering of the proposed method and the proposed system. It has to be emphasized that the design of the system has to consider the range of velocity to be measured in order to dimension to size of the azimuthal direction resolution and the appropriate filter characteristics for each of the azimuthal directions. Table 1 below therefore gives an example on the linear spatial resolution as a function of the distance to the object and of the angular azimuthal resolution.

TABLE 1 spatial resolution (i.e., minimal detectable linear wavelength) in mm for three distances (d) and four angular resolutions ($\Delta\phi$: i.e., size of the photoreceptors). The value is calculated using $l_{min} = d \cdot \tan(\Delta\phi)$

| d/$\Delta\phi$ | 0.1° | 1.0° | 5.0° | 10.0° |
| --- | --- | --- | --- | --- |
| 0.1 m | 0.2 | 1.8 | 8.7 | 17.6 |
| 1.0 m | 1.8 | 17.5 | 87.5 | 176.3 |
| 10.0 m | 17.5 | 174.6 | 874.9 | 1763.3 |

TABLE 2 illustrates the relationship between the spatial resolution and the temporal resolution. The table 2 shows the translational speed resolution as a function of the temporal frequency filter resolution and of the angular resolution.

| $\Delta TF/\Delta\phi$ | 0.1° | 1.0° | 5.0° | 10.0° |
| --- | --- | --- | --- | --- |
| 0.1 Hz | 0.2 | 1.8 | 8.7 | 17.6 |
| 1.0 Hz | 1.8 | 17.5 | 87.5 | 176.3 |
| 10.0 Hz | 8.8 | 87.3 | 437.5 | 881.7 |

The invention claimed is:

1. A method for determining a linear speed ($\Delta v$) of an object, comprising the steps of:
   a) sampling a series of light intensity courses I(t) over time t, each light intensity courses I(t) covering a different azimuthal direction, each different azimuthal direction defining a detection length ($\lambda_i$; i=1, ..., k) of a series of detection lengths ($\lambda_i$) as seen in a direction of the linear speed ($\Delta v$) to be determined;
   b) transforming the series of detection lengths ($\lambda_i$) for the azimuthal directions into a series of linear spatial frequencies ($SF_i$);
   c) defining for each azimuthal direction a band pass or a high pass filter, relating for each detection length ($\lambda_i$) characteristic filter frequencies to respective linear spatial frequencies ($SF_i$);
   d) filtering sampled light intensity for each azimuthal direction with the respective band pass or high pass filter to obtain a set of filtered light intensities;
   e) calculating the linear speed by dividing the characteristic filter frequencies through the linear spatial frequencies ($SF_i$) for at least one of azimuthal directions for which the filtered light intensity exceeds a predefined threshold; and
   f) determining the linear speed by correlating the calculated linear speeds for those azimuthal directions for which the filtered light intensity exceeds a predefined threshold.

2. The method according to claim 1, wherein each azimuthal direction covers a range of detection lengths ($\lambda_i + \Delta\lambda_i$) yielding a range of linear spatial frequencies ($SF_i$).

3. The method according to claim 1, wherein each band pass or high pass filter assigned to an azimuthal direction covers a range of throughput frequencies.

4. A system for determining a linear speed ($\Delta v$) of an object, comprising:
   a) a set of photoreceptors disposed on the object, composed of subsets of 3 photoreceptors, said subset of photoreceptors (35$_i$, o$_1$, o$_2$, o$_3$) measuring light intensities I(t) and being arranged to cover identical angular apertures pointing in different azimuthal directions, each different azimuthal direction defines a detection length ($\lambda_i$; i=1, ..., k) of a series of detection lengths ($\lambda$) as seen in a direction of the linear speed ($\Delta v$) to be determined;
   b) means (C) for calculation the linear speed ($\Delta v$) for evaluation subsets (36$_j$; j=1, ..., k−1), each evaluation subset (36$_j$) comprising the intensity inputs of three adjacent photoreceptors (o$_1$, o$_2$, o$_3$), by performing for at least part of the subsets (36$_j$);
   c) subtracting the light intensities inputs from two extreme photoreceptors (o$_1$, o$_3$) of each evaluation subset (36$_j$) to receive a first difference signal (s$_{13}$);

d) splitting the first difference signal ($s_{13}$) on two lines, one line delaying the difference signal ($s_{13}$) by a temporal delay ($\tau$);
e) subtracting the signals ($s_{13}$, delayed $s_{13}$) from the two lines to receive a second difference signal ($ts_{13}$); and
f) multiplying the second difference signal ($ts_{13}$) with the input from a central photoreceptor ($o_2$) to achieve an output signal (sso) being indicative for the linear speed ($\Delta v$).

\* \* \* \* \*